US012275849B2

(12) United States Patent
Donelson

(10) Patent No.: US 12,275,849 B2
(45) Date of Patent: Apr. 15, 2025

(54) COMPOSITIONS AND METHODS FOR ROAD SURFACING

(71) Applicant: Donelson Construction Co., LLC, Clever, MO (US)

(72) Inventor: Michael James Donelson, Springfield, MO (US)

(73) Assignee: DONELSON CONSTRUCTION CO., LLC, Clever, MO (US)

(*) Notice: Subject to any disclaimer, the term of this patent is extended or adjusted under 35 U.S.C. 154(b) by 1340 days.

(21) Appl. No.: 16/388,304

(22) Filed: Apr. 18, 2019

(65) Prior Publication Data
US 2020/0332126 A1 Oct. 22, 2020

(51) Int. Cl.
C08L 95/00 (2006.01)
C08K 7/02 (2006.01)
E01C 7/08 (2006.01)
E01C 7/35 (2006.01)
E01C 11/00 (2006.01)

(52) U.S. Cl.
CPC .............. C08L 95/005 (2013.01); C08K 7/02 (2013.01); E01C 7/085 (2013.01); E01C 7/353 (2013.01); E01C 11/005 (2013.01); C08L 2555/22 (2013.01); C08L 2555/24 (2013.01); C08L 2555/52 (2013.01)

(58) Field of Classification Search
CPC ..................................................... C08L 95/005
See application file for complete search history.

(56) References Cited

U.S. PATENT DOCUMENTS

| 4,373,960 A | 2/1983 | Ward, Jr. |
| 4,462,840 A * | 7/1984 | Schilling ............... C08L 95/005 |
| | | 106/269 |
| 5,153,026 A * | 10/1992 | Reed ......................... E01C 7/18 |
| | | 516/41 |
| 5,925,695 A | 7/1999 | Ohtsuka et al. |
| 6,444,258 B1 * | 9/2002 | Terry ....................... E01C 7/353 |
| | | 427/403 |
| 7,312,262 B2 | 12/2007 | Donelson et al. |
| 9,879,387 B2 | 1/2018 | Donelson et al. |
| 2002/0115752 A1 * | 8/2002 | Takamura .............. C08L 95/005 |
| | | 524/59 |
| 2003/0061970 A1 | 4/2003 | De Buen-Unna et al. |
| 2006/0127572 A1 * | 6/2006 | Raynaud ............. E01C 19/1068 |
| | | 427/212 |

OTHER PUBLICATIONS

St. Charles County Invitation for Formal Bids IFB 18-052 for Microsurface Treatment on County Roads in St. Charles County Missouri Project MS-18 (Year: 2018).*
IFB 18-052 Microsurface Treatment SCCMO Highway/Road and Bridge Projects Publication Date/Time Opening and Closing. https://www.sccmo.org/bids.aspx?bidID=644 (Year: 2018).*
IFB 18-052 Bid Responses SCCMO (Year: 2018).*

* cited by examiner

Primary Examiner — Alexandra M Moore
(74) Attorney, Agent, or Firm — Armstrong Teasdale LLP

(57) ABSTRACT

A composition for sealing and resurfacing a road surface includes a first material having at least a first emulsified asphalt, wherein the first material is applied to the road surface. The composition also includes a second material having a second emulsified asphalt and a driving surface material. The second material is applied to the first material such that the first material and the second material co-cure as a unified material.

128 Claims, 7 Drawing Sheets

COMPOSITIONS AND METHODS FOR ROAD SURFACING

BACKGROUND OF THE INVENTION

This disclosure relates generally to pavement re-surfacing and, more particularly, to a composition and methods for re-surfacing a pavement surface using a material dispersal and application device.

Many roadways and other paved surfaces exhibit surface wheel-rutting and general degradation over time. Re-surfacing is a solution which improves skid resistance and the overall quality of these surfaces by applying a uniform layer of a re-surfacing material to the surface. Typically, the layer of re-surfacing material is applied to the surface using a truck, or other mobile device, as it travels along the surface. The re-surfacing material may typically include a slurry material, emulsion oil, and/or an aggregate. The choice of material and method of application may vary depending at least on the project and any desired or necessary characteristics of the re-surfaced pavement.

At least some known re-surfacing methods and compositions include a emulsified asphalt applied to the existing road surface and then a layer of aggregate applied to the emulsified asphalt. Alternatively, the emulsified asphalt and aggregate are applied together as a slurry. In either case, in order for the emulsified asphalt to retain the aggregate in place, the emulsified asphalt is relatively thick in viscosity. As a result, the emulsified asphalt may not penetrate down into cracks in the road surface. The quantity and type of emulsified asphalt applied to the surface is primarily designed to retain the new aggregate wearing surface. Sealing of existing cracks and optimum adhesion of the new surface can be a secondary function. These two functions are known to be in respective conflict, often resulting in a compromising "middle ground" approach to current methods and compositions. Such a "middle ground" approach may include applying only a single material to the road surface where the material is designed to partially serve as a crack filling material and also as a trafficable material. As such, the material is not optimized for either purpose and has a higher softening point or lower penetration than potentially desirable.

At least some known re-surfacing methods include applying a first layer of soft material to a road surface and then applying an intermediate coating to the first layer to allow some vehicular traffic, construction traffic or otherwise, prior to placement of a second more permanent driving surface layer. Such an intermediate layer driving surface can act as a barrier to mitigate or prevent proper adhesion of the second driving surface layer. Additionally, if water is allowed to fully penetrate the second driving surface layer and reside between the layers (at or near a first layer driving surface) that water can potentially freeze and accelerate delamination.

BRIEF DESCRIPTION OF THE INVENTION

In one aspect, a composition for sealing and resurfacing a road surface is provided. The composition includes a first material having at least a first emulsified asphalt, wherein the first material is applied to the road surface. The composition also includes a second material having a second emulsified asphalt and a driving surface material. The second material is applied to the first material such that the first material and the second material co-cure as a unified material.

In another aspect, a composition for sealing and resurfacing a road surface is provided. The composition includes a first material having at least an emulsified asphalt, wherein the first material is applied to the road surface. The composition also includes a second material having a driving surface material and the emulsified asphalt. The driving surface material and the emulsified asphalt are applied to the first material simultaneously such that the first material and the second material co-cure as a unified material.

In another aspect, a composition for sealing and resurfacing a road surface is provided. The composition includes a first material having at least an emulsified asphalt, wherein the first material is applied to the road surface. The composition also includes a second material having a driving surface material and the emulsified asphalt. The second material is applied to the first material as a slurry such that the first material and the second material co-cure as a unified material.

In another aspect, a composition for sealing and resurfacing a road surface is provided. The composition includes a first material having an emulsified asphalt and a first aggregate having a first size, wherein the first material is applied to the road surface as a slurry. The composition also includes a second material including the emulsified asphalt and a second aggregate having a second size different than the first size. The second material is applied to the first material such that the first material and the second material co-cure as a unified material.

In another aspect, a composition for sealing and resurfacing a road surface is provided. The composition includes a first material having a first emulsified asphalt and a first aggregate having a first size, wherein the first material is applied to the road surface as a slurry. The composition also includes a second material having a second emulsified asphalt different from the first emulsified asphalt and a second aggregate having a second size larger than the first size. The second material is applied to the first material such that the first material and the second material co-cure as a unified material.

In yet another aspect, a method for sealing and resurfacing a road surface is provided. The method includes forming a first material including at least a first emulsified asphalt and applying the first material to the road surface. The method also includes applying a second material to the first material. Applying the second material include applying a second emulsified asphalt and applying a driving surface material. The second material is applied to the first material such that the first material and the second material co-cure as a unified material.

In yet another aspect, a method for sealing and resurfacing a road surface is provided. The method includes mixing a first emulsified asphalt with an additive to form a first material and applying the first material to the road surface. The method also includes applying a second material to the first material. Applying the second material includes applying a second emulsified asphalt and applying a driving surface material. The second material is applied to the first material such that the first material and the second material co-cure as a unified material.

In yet another aspect, a method for sealing and resurfacing a road surface is provided. The method includes applying a first emulsified asphalt to a road surface and applying a second emulsified asphalt to the first emulsified asphalt. The method also includes applying a driving surface material to the second emulsified asphalt and co-curing the first emulsified asphalt, the second emulsified asphalt, and the driving surface material as a unified material.

DETAILED DESCRIPTION OF THE INVENTION

Figure 1:
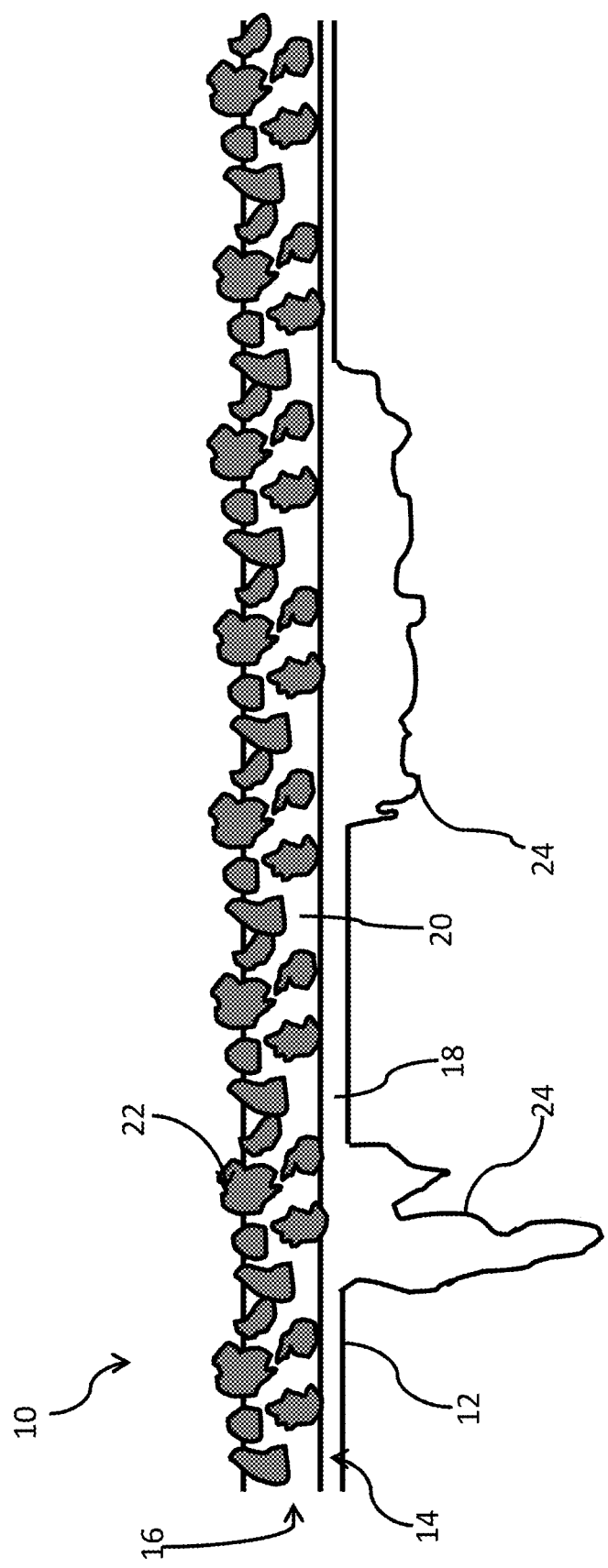
FIG. 1 is a diagram illustrating an exemplary road re-surfacing composition applied to a road surface.

As used herein, the term "emulsified asphalt" describes a combination of water, bitumen, and an emulsifier (surfactant) that allows homogenous compounding of the water and bitumen Emulsified asphalt is simply a suspension of small asphalt cement globules in water, which is assisted by an emulsifying agent (such as soap). The emulsifying agent assists by imparting an electrical charge to the surface of the asphalt cement globules so that they do not coalesce. Emulsions are used because they effectively reduce asphalt viscosity for lower temperature uses Emulsions are typically either anionic (asphalt droplets are negatively charged) or cationic (asphalt particles are positively charged).

As used herein, the term "co-cure" describes multiple layers of different materials that cure substantially simultaneously. Curing is designed to begin essentially upon placement on an intended surface. Curing begins when the emulsified asphalt begins to "break", or the water separates from the asphalt. Curing can be initiated by adding a material or substance just prior to placement, or simply by exposing the emulsion to conditions outside of its storage vessel, including contact with other materials.

As used herein, the term "unified material" describes a material that is made up of different strata that co-cure to interlock together and form an integral material composition.

As used herein, the term "additive" describes a material or substance added to emulsified asphalt, during or after the emulsion manufacturing process, to increase the softening point and/or decrease the penetration level of the emulsified asphalt. An additive is also describes a material or substance added to the base asphalt prior to the emulsion manufacturing process. Such materials may be filler materials that increase the stability of the emulsified asphalt. Example filler materials may be: aggregate, mineral filler, crushed fines, lime, fly ash, carbon black, sand, clay, and slag (e.g., boiler slag or steel slag), among others. Another additive material may include polymers that make the emulsified asphalt resistant to deformation at higher temperatures or improve ductility at colder temperatures. Example polymers include: natural latex, synthetic latex, rubber, and reclaimed rubber (e.g., ground rubber tires), among others. Another additive material may include various fibers such as: polypropylene, polyester, mineral, and cellulose, among others.

As used herein, the term "filler material" describes a material or substance added to emulsified asphalt to provide body and increase the stability of the emulsified asphalt. Filler materials also generally increase the softening point and/or decrease the penetration level of the emulsified asphalt. Example filler materials include: aggregate, mineral filler, crushed fines, lime, fly ash, carbon black, sand, clay, slag (e.g., boiler slag or steel slag), chat, sedimentary stone, metamorphic stone, and igneous stone, among others.

As used herein, the term "driving surface material" describes the exposed material that makes up the surface that vehicles will contact and drive upon. Example driving surface materials include: aggregate, crushed aggregate, lightweight aggregate, and slag (e.g., boiler slag or steel slag), chat, sedimentary stone, metamorphic stone, and igneous stone, among others.

As used herein, the term "penetration level" is the result of performing a penetration test on an emulsified asphalt and describes the depth of penetration of a standard needle measured in units of 0.1 mm and reported as a penetration level (e.g., if the needle penetrates 8 mm, the asphalt's penetration level is 80). According to the American Association of State Highway and Transportation Officials, the penetration test is performed by melting and cooling the emulsified asphalt sample under controlled conditions, and then measuring the penetration of a standard needle into the emulsified asphalt sample under a load of 100 grams at a temperature of 25 C (77° F.), and for a duration of 5 seconds. These test conditions are consistent with those for ASTM D5/D5M-13.

Penetration grading's basic assumption is that the less viscous the asphalt, the deeper the needle will penetrate. This penetration depth is empirically (albeit only roughly) correlated with asphalt binder performance. Therefore, asphalt binders with high penetration numbers (called "soft") are used for cold climates while asphalt binders with low penetration numbers (called "hard") are used for warm climates.

As used herein, the term "softening point" describes the temperature at which an emulsified asphalt sample can no longer support the weight of a 3.5 gram steel ball. According to the American Association of State Highway and Transportation Officials, the softening test is performed by heating two horizontal disks of emulsified asphalt, cast in shouldered brass rings, at a controlled rate in a liquid bath while each supports a steel ball. The softening point is reported as the mean of the temperatures at which the two disks soften enough to allow each ball, enveloped in emulsified asphalt, to fall a distance of 25 mm (1.0 inch). This test is commonly known as the ring and ball softening test. These test conditions are consistent with those for ASTM D36/D36M-14e1.

As used herein, the term "slurry" describes a cold (ambient or low temperature) aggregate and emulsified asphalt blend. Such a slurry is conventionally compounded with water for effective mixing and may contain a catalyst or retarder to affect the composition's cure time, or other catalyst to aid in curing along with other additives.

Finally, the term "chip seal surface" describes emulsified asphalt sprayed or otherwise applied onto a road surface and covered by aggregate to create a new wearing/driving surface.

As used herein, the term "delivery mechanism" describes any biased or unbiased device(s) or structure(s), or combination thereof that is the vehicle or pathway for a spreadable material to be transferred, or "delivered" from a source tank or mixing chamber to a pavement surface. The delivery mechanism(s) may be fully or partially enclosed to allow controllable flow of the spreadable material to the pavement surface. For instance, spreadable material that is applied onto a pavement surface, and spread across that surface with an auger or similar dispersing device, may be applied uniformly or not uniformly, depending upon desired results.

Furthermore, as used herein, the term "dispersing/dispersal mechanism/device/bar" describes any biased or unbiased device(s) or structure(s), or combination thereof that facilitates spreading the spreadable material into cracks formed in the pavement surface and/or into a generally uniform layer of material on the pavement surface.

FIG. 1 illustrates an exemplary road re-surfacing composition 10 for resurfacing a road surface 12. In one embodiment, composition 10 includes a first material 14 applied to the road surface 12 and a second material 16 applied to the first material 14 such that the first material 14 and the second material 16 co-cure as a unified material. More specifically, the first material 14 includes a first emulsified asphalt 18 and the second material 16 also includes a second emulsified asphalt 20 in addition to a driving surface material 22.

The first material 14 is a non-trafficable material that serves as a binder layer to adhere the second material 16 to the road surface 12. Additionally, the first material 14 is designed to be facilitated into deformations 24 in the road surface 12 such as cracks, pores, fissures, and voids, as described herein. As such, it is desired that the first material 14 is a ductile, crack-filling material that both fills in deformations 24 and also that binds the second material 16 to the road surface 12. As described herein, the second material 14 having the driving surface material 22 would not penetrate as deep into deformations 24 as does the first material 14.

The first material 14 and the second material 16 co-cure to interlock together to produce a single unified material with advantageous properties. Specifically, the first material 14 is stickier and more ductile to fill deformations 24 in the road surface 12 to provide a more stable structure for complete attachment of the second material 16 that prevents delamination. Whereas, the second material 14 is a tougher material that can withstand vehicle traffic and weather exposure.

Furthermore, the first material 14 not only attaches and adheres to the road surface 12, but also to the sidewalls of the deformations, which is significant as deformations, such as cracks, tend to widen during colder temperatures. The softer, more ductile emulsified asphalt 18 of the first material 14 is able to move laterally in cracks, which is a feature conventional driving surfaces are unable to accomplish even if formed with sufficiently sized stone that enabled crack penetration.

Traditionally, a first layer of soft material is applied to a road surface and then an intermediate coating is applied to the first layer to allow some vehicular traffic, construction traffic or otherwise, prior to placement of a second more permanent driving surface layer. Such an intermediate layer driving surface can act as a barrier to mitigate or prevent proper adhesion of the second driving surface layer. Additionally, if water is allowed to fully penetrate the second driving surface layer and reside between the layers (at or near a first layer driving surface) that water can potentially freeze and accelerate delamination.

In the exemplary embodiment described herein, the first and second materials 14 and 16 co-cure as one contiguous coating 10 that actually maximizes adhesion and compatibility between layers as asphalt droplets and compositions are allowed to fuse at a microscopic level. Such fusion also allows for a gradual transition of the first and second material layers 14 and 16 and respective properties of each, thereby mitigating incompatibility issues such as second layer driving surface slippage/delamination.

In one embodiment, the first material 14 includes the first emulsified asphalt 18 and an additive that increases the softening point of the first emulsified asphalt 18, and, therefore, the first material 14. Increasing the softening point of the first emulsified asphalt 18 serves to provide better stability when exposed to heat, while still maintaining cold weather ductility. The additive is added to the initially softer first emulsified asphalt 18 because simply using a more viscous initial asphalt without the additive would reduce the crack-filling ability of the viscous asphalt. As such, the first emulsified asphalt 18 is modified with the additive to increase its softening point. As described herein, the softening point describes the temperature at which an emulsified asphalt sample can no longer support the weight of a standardized steel ball.

In the exemplary embodiments described herein, the additive includes at least one of aggregate, rubber, fibers, sand, and polymer, among others listed above. In some embodiments, the first material 14 includes more than one additive. For example, in one embodiment, first material 14 includes aggregate and a polymer.

For example, in one embodiment, the first emulsified asphalt has an initial softening point of no more than 60 degrees Fahrenheit (F). The additive is then added to the first emulsified asphalt 18 to increase the softening point of the first emulsified asphalt 18 such that the first material 14 includes a softening point of at least 80 F. Alternatively, the additive increases the softening point of the first emulsified asphalt 18 such that the first material 14 includes a softening point of at least 100 F. Alternatively, the additive increases the softening point of the first emulsified asphalt 18 such that the first material 14 includes a softening point of at least 125 F. Alternatively, the additive increases the softening point of the first emulsified asphalt 18 such that the first material 14 includes a softening point of at least 150 F. Alternatively, the additive increases the softening point of the first emulsified asphalt 18 such that the first material 14 includes a softening point of at least 175 F.

In another example, the first emulsified asphalt has an initial softening point of no more than 80 F. The additive is then added to the first emulsified asphalt 18 to increase the softening point of the first emulsified asphalt 18 such that the first material 14 includes a softening point of at least 100 F. Alternatively, the additive increases the softening point of the first emulsified asphalt 18 such that the first material 14 includes a softening point of at least 125 F. Alternatively, the additive increases the softening point of the first emulsified asphalt 18 such that the first material 14 includes a softening point of at least 150 F. Alternatively, the additive increases the softening point of the first emulsified asphalt 18 such that the first material 14 includes a softening point of at least 175 F. Alternatively, the additive increases the softening point of the first emulsified asphalt 18 such that the first material 14 includes a softening point of at least 200 F.

In yet another example, the first emulsified asphalt has an initial softening point of no more than 100 F. The additive is then added to the first emulsified asphalt 18 to increase the softening point of the first emulsified asphalt 18 such that the first material 14 includes a softening point of at least 125 F. Alternatively, the additive increases the softening point of the first emulsified asphalt 18 such that the first material 14 includes a softening point of at least 150 F. Alternatively, the additive increases the softening point of the first emulsified asphalt 18 such that the first material 14 includes a softening point of at least 175 F. Alternatively, the additive increases the softening point of the first emulsified asphalt 18 such that the first material 14 includes a softening point of at least 200 F. Alternatively, the additive increases the softening point of the first emulsified asphalt 18 such that the first material 14 includes a softening point of at least 225 F.

In yet another example, the first emulsified asphalt has an initial softening point of no more than 125 F. The additive is then added to the first emulsified asphalt 18 to increase the softening point of the first emulsified asphalt 18 such that the first material 14 includes a softening point of at least 150 F. Alternatively, the additive increases the softening point of the first emulsified asphalt 18 such that the first material 14 includes a softening point of at least 175 F. Alternatively, the additive increases the softening point of the first emulsified asphalt 18 such that the first material 14 includes a softening point of at least 200 F. Alternatively, the additive increases the softening point of the first emulsified asphalt 18 such that the first material 14 includes a softening point of at least 225 F. Alternatively, the additive increases the softening point of the first emulsified asphalt 18 such that the first material 14 includes a softening point of at least 250 F.

In yet another example, the first emulsified asphalt has an initial softening point of no more than 150 F. The additive is then added to the first emulsified asphalt 18 to increase the softening point of the first emulsified asphalt 18 such that the first material 14 includes a softening point of at least 175 F. Alternatively, the additive increases the softening point of the first emulsified asphalt 18 such that the first material 14 includes a softening point of at least 200 F. Alternatively, the additive increases the softening point of the first emulsified asphalt 18 such that the first material 14 includes a softening point of at least 225 F. Alternatively, the additive increases the softening point of the first emulsified asphalt 18 such that the first material 14 includes a softening point of at least 250 F. Alternatively, the additive increases the softening point of the first emulsified asphalt 18 such that the first material 14 includes a softening point of at least 275 F.

Furthermore, the additive(s) not only increases the softening point of the first emulsified asphalt 18, but it also reduces the penetration level of the first emulsified asphalt 18. Similar to increasing the softening point, decreasing the penetration level of the first emulsified asphalt 18 serves to provide better stability when exposed to heat, while still maintaining cold weather ductility. Penetration level and softening point are simply two different ways to measure characteristics of the first emulsified asphalt 18. As described herein, the penetration level describes the depth of penetration of a needle into a cooled sample of the asphalt under a standardized load and at a standardized temperature.

For example, in one embodiment, the first emulsified asphalt 18 has an initial penetration level of at least 500. The additive is then added to the first emulsified asphalt 18 to decrease the penetration level of the first emulsified asphalt 18 such that the first material 14 includes a penetration level of at most 400. Alternatively, the additive increases the penetration level of the first emulsified asphalt 18 such that the first material 14 includes a penetration level of at most 300. Alternatively, the additive increases the penetration level of the first emulsified asphalt 18 such that the first material 14 includes a penetration level of at most 200. Alternatively, the additive increases the penetration level of the first emulsified asphalt 18 such that the first material 14 includes a penetration level of at most 100. Alternatively, the additive increases the penetration level of the first emulsified asphalt 18 such that the first material 14 includes a penetration level of at most 50.

In another embodiment, the first emulsified asphalt 18 has an initial penetration level of at least 400. The additive is then added to the first emulsified asphalt 18 to decrease the penetration level of the first emulsified asphalt 18 such that the first material 14 includes a penetration level of at most 300. Alternatively, the additive increases the penetration level of the first emulsified asphalt 18 such that the first material 14 includes a penetration level of at most 200. Alternatively, the additive increases the penetration level of the first emulsified asphalt 18 such that the first material 14 includes a penetration level of at most 100. Alternatively, the additive increases the penetration level of the first emulsified asphalt 18 such that the first material 14 includes a penetration level of at most 50.

In yet another embodiment, the first emulsified asphalt 18 has an initial penetration level of at least 300. The additive is then added to the first emulsified asphalt 18 to decrease the penetration level of the first emulsified asphalt 18 such that the first material 14 includes a penetration level of at most 200. Alternatively, the additive increases the penetration level of the first emulsified asphalt 18 such that the first material 14 includes a penetration level of at most 100. Alternatively, the additive increases the penetration level of the first emulsified asphalt 18 such that the first material 14 includes a penetration level of at most 50.

In yet another embodiment, the first emulsified asphalt 18 has an initial penetration level of at least 200. The additive is then added to the first emulsified asphalt 18 to decrease the penetration level of the first emulsified asphalt 18 such that the first material 14 includes a penetration level of at most 100. Alternatively, the additive increases the penetration level of the first emulsified asphalt 18 such that the first material 14 includes a penetration level of at most 50.

In yet another embodiment, the first emulsified asphalt 18 has an initial penetration level of at least 100. The additive is then added to the first emulsified asphalt 18 to decrease the penetration level of the first emulsified asphalt 18 such that the first material 14 includes a penetration level of at most 50.

In one embodiment, the first emulsified asphalt 18 is different from the second emulsified asphalt 20. More specifically, the first emulsified asphalt 18 is configured to fill and seal a crack on the road surface 12 and the second emulsified asphalt 20 is configured to retain the driving surface material 22. In such an embodiment, the first emulsified asphalt 18 has a first softening point and the second emulsified asphalt 20 has a second softening point higher than the first emulsified asphalt. Similarly, the first emulsified asphalt 18 has a first penetration level and the second emulsified asphalt 20 has a second penetration level lower than the first penetration level. Furthermore, the second material 16 may also include an additive similar to the first material 14 even when emulsified asphalts 18 and 20 are different. Specifically, the first material 14 includes an additive configured to increase the softening point of the first emulsified asphalt 18, and the second material 16 also includes an additive configured to increase the softening point of the second emulsified asphalt 20. In such a configuration, the additives in the first and second materials 14 and 16 may be the same, or they may be different.

When the first emulsified asphalt 18 and the second emulsified asphalt 20 are different, the first material 14 may further include at least one filler material. As described herein, filler materials provide body to the first material 14 and increase the stability of the emulsified asphalt. Example filler materials include: aggregate, mineral filler, crushed fines, lime, fly ash, carbon black, sand, clay, slag (e.g., boiler slag or steel slag), chat, sedimentary stone, metamorphic stone, and igneous stone, ground rubber, and fibers, among others. In one embodiment, the filler material includes particles having a size within a range of between approximately 0.02 inches and approximately 0.125 inches. In another embodiment, the filler material includes a first aggregate having a first size and the driving surface 22 includes a second aggregate having a second size different from the first size.

Still referring to embodiments where the first emulsified asphalt 18 is different from the second emulsified asphalt 20, the driving surface material 22 includes at least one of crushed aggregate, aggregate, lightweight aggregate, and steel slag. Furthermore, in one embodiment, the driving surface material 22 and the second emulsified asphalt 20 are applied simultaneously as a slurry. In such a configuration, the driving surface material 22 includes an aggregate having a size within a range of between approximately 0.125 inches and approximately 0.375 inches to allow for pumping of the slurry. Alternatively, the second emulsified asphalt 20 is applied to the first material 14 and the driving surface material 22 is applied separately to the second emulsified asphalt 20. In such embodiments, the driving surface material 22 includes an aggregate having a size within a range of between approximately 0.5 inches and approximately 1.0 inch.

It is further contemplated that the first emulsified asphalt 18 is the same as the second emulsified asphalt 20. Functionally, the first emulsified asphalt 18 is still configured to fill and seal a crack on the road surface 12 and the second emulsified asphalt 20 is still configured to retain the driving surface material 22. However, emulsified asphalt 18 and 20 may be combined with different additives to accomplish the intended function. Specifically, the first material 14 includes an additive configured to increase the softening point of the first emulsified asphalt 18, and the second material 16 also includes an additive configured to decrease the softening point of the second emulsified asphalt 20.

When the first emulsified asphalt 18 and the second emulsified asphalt 20 are the same, the first material 14 may further include at least one filler material. As described herein, filler materials provide body to the first material 14 and increase the stability of the emulsified asphalt. Example filler materials include: aggregate, mineral filler, crushed fines, lime, fly ash, carbon black, sand, clay, slag (e.g., boiler slag or steel slag), chat, sedimentary stone, metamorphic stone, and igneous stone, ground rubber, and fibers, among others. In one embodiment, the filler material includes a first aggregate having a first size and the driving surface 22 includes a second aggregate having a second size different from the first size. Specifically, the second size of the second aggregate is larger than the first size of the first aggregate. More specifically, the first aggregate is within a range of between approximately 0.02 inches and approximately 0.125 inches.

Still referring to embodiments where the first emulsified asphalt 18 is the same as the second emulsified asphalt 20, the driving surface material 22 includes at least one of crushed aggregate, aggregate, lightweight aggregate, and steel slag. Furthermore, in one embodiment, the driving surface material 22 and the second emulsified asphalt 20 are applied simultaneously as a slurry. In such a configuration, the first material 14 includes a first aggregate within a range of between approximately 0.02 inches and approximately 0.125 inches and the driving surface material 22 of the second material 16 includes a second aggregate within a range of between approximately 0.125 inches and approximately 0.325 inches. Alternatively, the second emulsified asphalt 20 is applied to the first material 14 and the driving surface material 22 is applied separately to the second emulsified asphalt 20. In such embodiments, the first material 14 includes a first aggregate within a range of between approximately 0.02 inches and approximately 0.125 inches and the driving surface material 22 includes an aggregate having a size within a range of between approximately 0.5 inches and approximately 1.0 inch.

In all contemplated embodiments, the first material 14 is a ductile material that is able to be facilitated into deformations 24 in the road surface 12 to fill and seal the deformations and that also sufficiently tacky to adhere the second material 14 thereto. Alternatively, the second material 14 makes up the driving surface of the composition 10 and so is harder and stronger and able to withstand exposure to vehicle traffic. When the two emulsified asphalts 18 and 20 co-cure together, they combine to form a unified material that prevents delamination of the second material 14 from the road surface 12. As such, composition 10 is formed by co-curing a ductile crack-fill material, the first material 14, with a driving surface, the second material 16.

Figure 2:
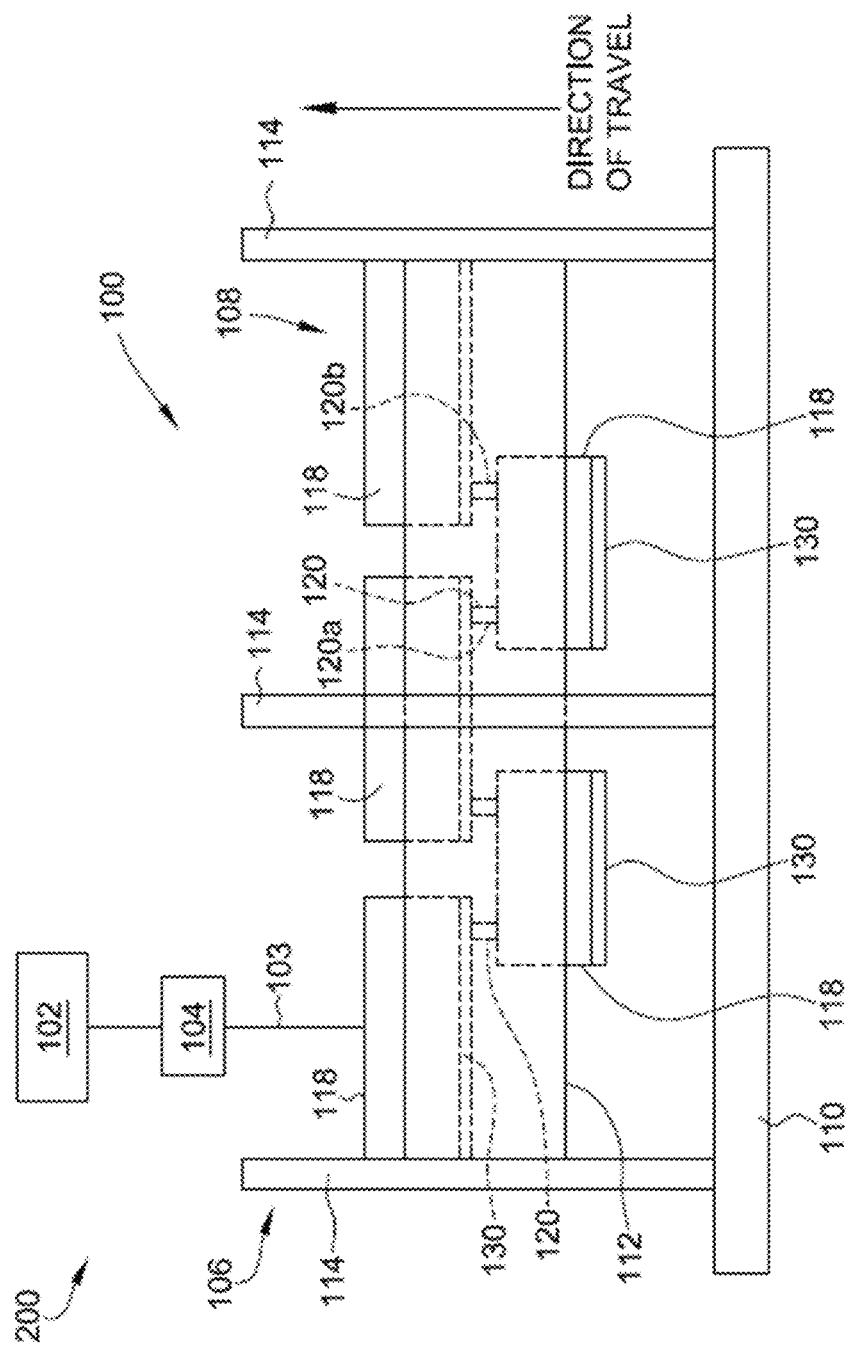
FIG. 2 is a schematic top view of an exemplary material application and dispersal device having a plurality of exemplary material application mechanisms for use in a re-surfacing system that applies the re-surfacing composition.
Figure 3:
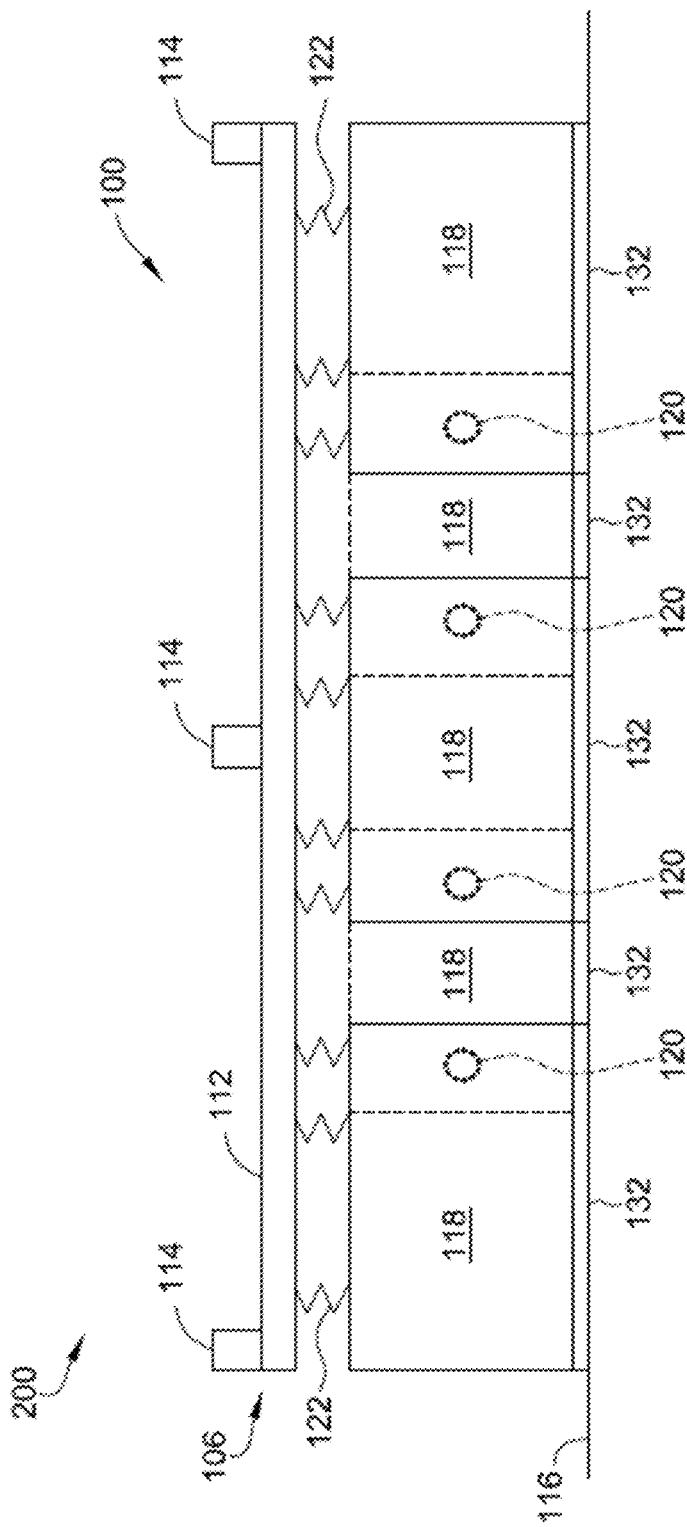
FIG. 3 is a schematic front view of the material application and dispersal device shown in FIG. 2.
Figure 4:
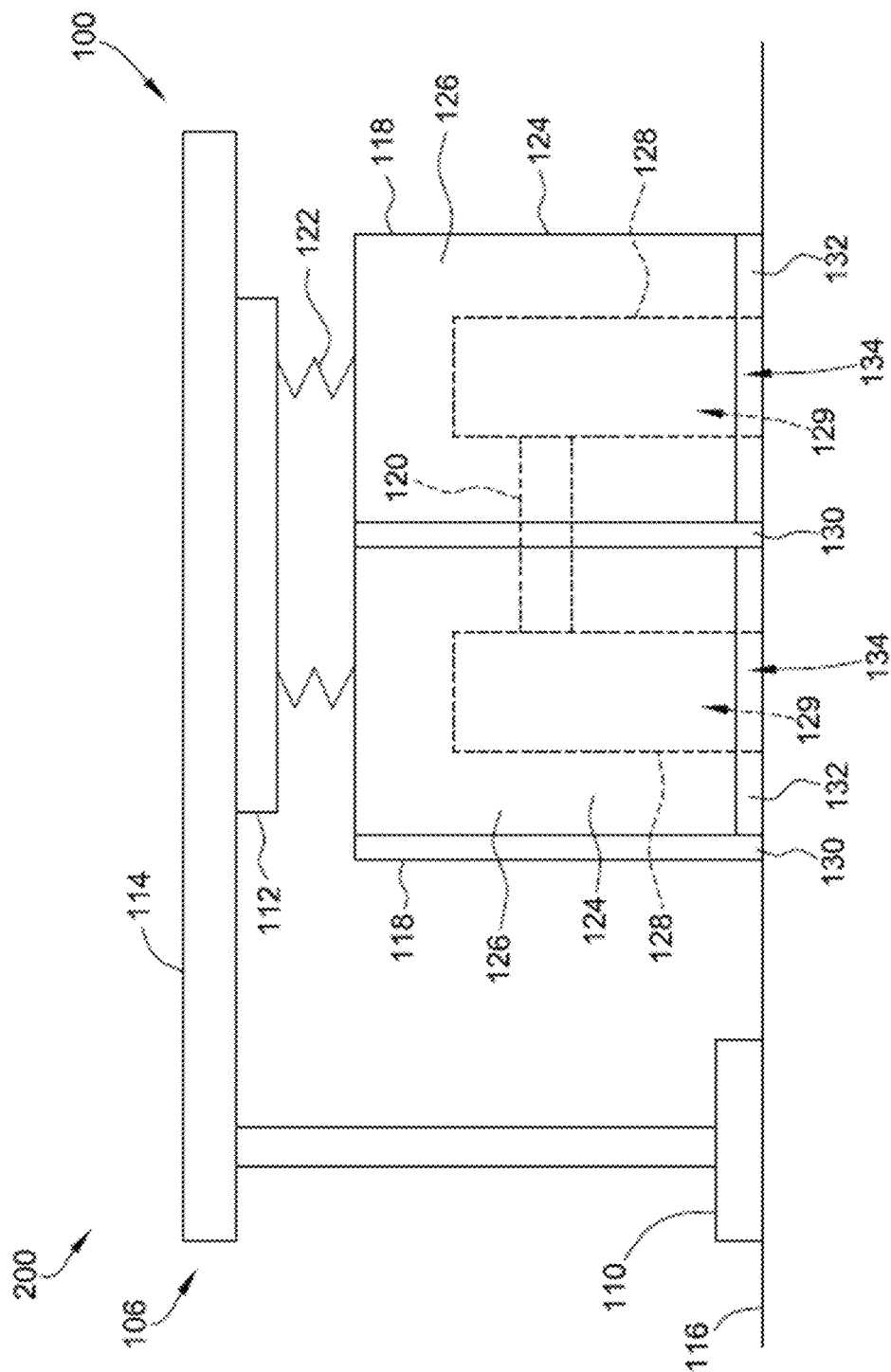
FIG. 4 is a schematic side view of the material application and dispersal device shown in FIG. 2.

FIG. 2 is a schematic view of a material application and dispersal device (MADD) 100 for use in a re-surfacing system 200 that applies the first material 14 to the road surface 12. FIG. 3 is a schematic front view of MADD 100, and FIG. 4 is a schematic side view of MADD 100. System 200 also includes a source 102 of first material 14 and a pressurization device 104 coupled in flow communication with source 102 via a conduit 103 to facilitate channeling the first material 14 between source 102 and MADD 100.

In the exemplary embodiment, MADD 100 includes a frame 106, a material application assembly (MAA) 108 coupled to frame 106, and a depth control device 110 coupled to frame 106. Frame 106 includes at least one first support member 112 and a plurality of second support members 114 coupled to first support member 112. First support member 112 is coupled to MAA 108 and is oriented substantially perpendicular to a direction of travel of MADD 100. More specifically, first support member 112 is adjustably coupled to second support member 114 such that first support member 112 provides a modifiable downward force on MAA 108 to change the contact pressure of MAA 108 on a road surface 12. In the exemplary embodiment, MADD 100 includes a single first support member 112 and MAA 108. In other embodiments, MADD 100 includes more than one first support member 112 and MAA 108. Second support members 114 are coupled to a mobile device (not shown) such as a truck, or other mobile device, as it travels along road surface 12. Second support members 114 are oriented substantially parallel to the direction of travel and are also coupled to depth control device 110.

In the exemplary embodiment, MADD 100 is configured to apply the first material 14 uniformly to road surface 12 through MAA 108. More specifically, a positive pressure built up within MAA 108 by pressurization device 104 injects the first material 14 into cracks in road surface 12. MAA 108 includes a plurality of segmented, independently biased material application mechanisms (MAMs) 118 coupled to first support member 112. Each MAM 118 applies the first material 14 to road surface 12. More specifically, MAMs 118 are segmented with sufficient frequency across a width of MADD 100 so they apply sufficient pressure to the first material 14 and allow uniform dispersion of the first material 14 when road surface 12 is uneven, e.g., when road surface 12 is a roadway with surface wheel-rutting. Although MAA 108 is described herein as including a plurality of MAMs 118, in some embodiments, MAA 108 includes a single MAM 118 that spans a full width of MADD 100.

During operation of system 200 in accordance with the example embodiment, first material 14 is channeled from source 102 to MADD 100 by pressurization device 104 through conduit 103. In the exemplary embodiment, pressurization device 104 is a pump that continuously recirculates the first material 14 between source 102 and MAMs 118 of MADD 100. Alternatively, pressurization device 104 is any device, for example, but not limited to, pneumatic, hydraulic, mechanical, or other biasing mechanisms that facilitate operation of MADD 100 as described herein. As described in further detail below, each MAM 118 at least partially forms a seal with road surface 12 and pressurization device 104 generates a positive pressure within each MAM 118 that forces the first material 14 into cracks formed in road surface 12 to apply a re-surfacing layer of first material 14. MAA 108 then smooths the deposited first material 14 over road surface 12. Depth control device 110 then passes over the re-surfacing layer of first material 14 to control the depth of the re-surfacing layer. In one embodiment, depth control device 110 is a mechanical device that is dragged over the re-surfacing layer. In another embodiment, depth control device 110 is a pneumatic device that expels air through a fine nozzle (air blade). Furthermore, in yet another embodiment, depth control device 110 also texturizes the re-surfacing layer.

In the exemplary embodiment, MAA 108 includes a plurality of MAMs 118 coupled together such that MAMs 118 form a single linked row that spans the width of MADD 100. Furthermore, a portion of each MAM 118 is offset with respect to an adjacent MAM 118 such that portions of adjacent MAMs 118 overlap. Offsetting each MAM 118 with respect to an adjacent MAM 118 facilitates smoothing any ridge that may form at opposing ends of MAMs 118 and evenly dispersing the first material 14.

In the exemplary embodiment, MAA 108 includes a plurality of connecting links 120 that pivotally couple adjacent MAMs 118 to one another. Connecting links 120 enable one MAM 118 to pivot with respect to the adjacent MAM 118 to which it is coupled in response to changes in road surface 12 contour. As such, each MAM 118 is independently pivotable with respect to adjacent MAMs 118 to facilitate delivering an even re-surfacing layer of first material 14 onto road surface 12.

Figure 5:
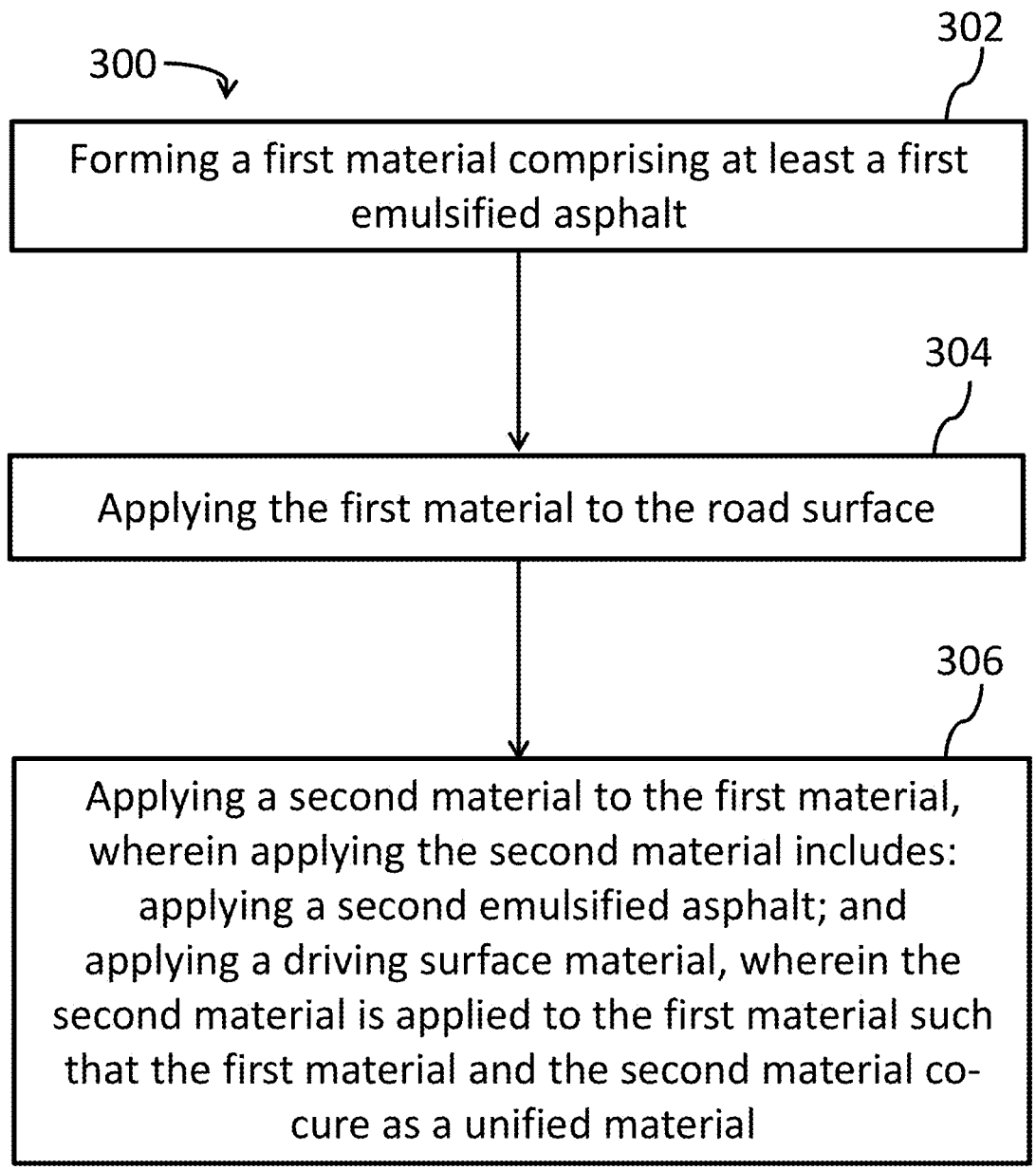
FIG. 5 is a flowchart illustrating a method for sealing and resurfacing a road surface.

In one embodiment, connecting links 120 also couple adjacent MAMs 118 in fluid communication with each other and facilitate channeling the first material 14 through the plurality of coupled MAMs 118. More specifically, each MAM 118 includes a connecting link inlet 120a for receiving a flow of first material 14 and a connecting link outlet 120b for discharging a portion of the flow of first material 14 from the MAM 118. As such, in the exemplary embodiment, connecting links 120 serve two purposes: 1) to pivotally couple adjacent MAMs 118 such that each MAM 118 maintains continuous contact with road surface 12; and 2) to couple adjacent MAMs 118 in flow communication to facilitate channeling the first material 14 therethrough. In an alternative embodiment, as shown in FIG. 5, each MAM 118 includes a pair of connecting links 120 for coupling to adjacent MAMs 118, but each MAM 118 also includes a separate first material inlet 121a and a first material outlet 121b spaced away from connecting links 120. Also shown in FIG. 5 is an optional application device 123 that may be used to apply the first material 14 to road surface 12. In one embodiment, application device 123 is a ball valve positioned within MAM 118. The ball gets displaced when MAM 118 is biased downward toward road surface 12 and allows the first material 14 to flow from within MAM 118, through the ball valve, and onto road surface 12.

In the exemplary embodiment, MAA 108 also includes a plurality of biasing elements 122 coupled between MAA 108 and first support member 112. More specifically, MAA 108 includes at least one biasing element 122 coupled between each MAM 118 and first support member 112. In the exemplary embodiment, biasing elements 122 provide a downward biasing force onto an associated MAM 118 such that MAM 118 maintains a seal with road surface 12. Furthermore, biasing elements 122 enable each MAM 118 to move vertically and rotate in order to follow the contour of road surface 12.

In the exemplary embodiment, each MAM 118 includes a vessel 124 having a plurality of walls 126 that form a cavity 128 within vessel 124. Walls 126 also define an opening 129 at a bottom of vessel 124 proximate road surface 12. Opening 129 is in flow communication with cavity 128 such that the first material 14 can be channeled from cavity 128 through bottom opening 129 to road surface 12. In the exemplary embodiment, bottom opening 129 includes a length that extends a majority of a length of MAM 118 and a width within a range of approximately 0.5 inches (in.) to 2.0 in. Alternatively, bottom opening 129 includes any dimensions that facilitate operation of MAM 118 as described herein.

Furthermore, as described herein, a positive pressure is created within each cavity 128, such as by pressurization device 104, which facilitates channeling the first material 14 through adjacent MAMs 118 and applying the first material 14 to road surface 12. As such, a portion of the first material 14 that is channeled into each cavity 128 is further channeled to an adjacent MAM 118, through connecting links 120, and a second portion of the first material 14 is applied to road surface 12 through bottom opening 129. As described above, in the exemplary embodiment, connecting links 120 serve to channel the first material 14 between adjacent MAMs 118. More specifically, links 120 couple cavities 128 of adjacent MAMs 118 in fluid communication to enable the first material 14 to flow therethrough. In this embodiment, MAMs 118 are linked together in a chain such that MAA 108 includes a single inlet and a single outlet coupled to pressurization device 104 which recirculates the first material 14 between source 102 and MAA 108 without being coupled to each individual MAM 118. Alternatively, each MAM 118 is coupled individually to pressurization device 104 to facilitate channeling the first material 14 to each MAM 118 independently.

Furthermore, each MAM 118 includes a dispersing element 130. In the exemplary embodiment, dispersing element 130 is coupled to a rear wall of the plurality of walls 126 of vessel 124 and evenly disperses the first material 14 after it has been applied to road surface 12. In the exemplary embodiment, dispersing element 130 is either a brush or a blade (e.g., a squeegee). Alternatively, dispersing element 130 is any other means of evenly dispersing the first material 14 on road surface 12. The type of dispersing element 130 is determined by the desired application characteristics. For example, a brush may be desirable when applying an emulsion oil to road surface 12 to facilitate urging the emulsion oil into voids, or cracks, in the pavement surface. Alternatively, a blade may be desirable when applying a first material 14 to the road surface 12 to facilitate application of a smooth and even layer of the first material 14 due to its more rigid construction when compared to a brush.

In the exemplary embodiment, each MAM 118 also includes a sealing element 132 coupled to vessel 124 proximate road surface 12. Sealing elements 132 are biased downward by at least one of first supporting member 112 and biasing elements 122 to contact road surface 12. As such, sealing elements 132 at least partially form a seal between MAM 118 and road surface 12 such that the positive pressure within cavity 128 of MAM 118 is generated. More specifically, a combination of sealing elements 132, biasing elements 122, walls 126, and pressurization device 104 completely enclose cavity 128 to create a positive pressure differential between cavity opening 129 and the ambient atmosphere. As used herein, the term "positive pressure" is used to describe a pressure level within cavity 128 of MAM 118 that is greater than the nominal head pressure caused by the weight of the first material 14 pushing down on itself in an open container exposed to ambient conditions. That is, the enclosed cavity 128 formed by walls 126, sealing element 132, and road surface 12 enables pressurization device 104 to increase the pressure within cavity 128 to a level greater than would be attainable if cavity 128 were not enclosed. More specifically, in the exemplary embodiment, the pressure within cavity 128 during operation is within a range of 1 pound per square inch (psi) to 15 psi. In another embodiment, the pressure within cavity 128 during operation is within a range of 1 psi to 5 psi. In yet another embodiment, the pressure within cavity 128 during operation is within a range of 6 psi to 10 psi.

This pressure differential creates the positive pressure within cavities 128 that facilitate injecting the first material 14 into cracks in road surface 12. Generating positive pressure within MAMs 118 enables the use of a more viscous first material 14 that, under non-positively pressurized conditions, would not flow through conduit 103 and MAMs 118 and into a crack in road surface 12. The use of a more viscous material is advantageous because once the first material 14 is injected into the crack, it is more likely to remain in the crack and fill the void to create a smooth surface.

Sealing elements 132 are formed from a resilient material, for example but not limited to rubber, plastic, and natural or synthetic fibers, such that sealing elements 132 may change shape follow the contour of road surface 12 to maintain continuous contact with road surface 12. In the exemplary embodiment, sealing elements 132 include any combination of a unitary component, a plurality of strips, and a plurality of bristles. Alternatively, sealing elements 132 are formed from any material in any configuration that facilitates operation of MADD 100 as described herein. Furthermore, each sealing element 132 includes a bottom opening 134 in flow communication with cavity 128 such that the first material 14 can be channeled from cavity 128 through bottom opening 129 and through bottom opening 134 to road surface 12.

In embodiments where second material 16 is applied as a slurry, another MADD 100 may be used to apply the second material 16 to the first material 14. Alternatively, where the second material 16 is applied as a chip seal with the second emulsified asphalt 20 being applied to the first material 14 and then the driving surface material 22 applied to the second emulsified asphalt 20, a traditional chip seal application system may be used.

FIG. 5 is a flowchart illustrating an exemplary method 300 for sealing and resurfacing a road surface. In the exemplary embodiment, method 300 is implemented by a re-surfacing system including a material dispersal device, such as system 200 shown in FIG. 2.

During operation, a first material is formed 302 from at least a first emulsified asphalt. Specifically, the first material is formed 302 from the first emulsified asphalt having a softening point of no more than 60 F. Additionally, forming 302 the first material includes mixing the first emulsified asphalt with an additive to increase the softening point of the first material. More specifically, mixing the first emulsified asphalt with an additive includes mixing the first emulsified asphalt with at least one of aggregate, rubber, fibers, sand, and polymer. Furthermore, in one embodiment, mixing the first emulsified asphalt with the additive increases the softening point of the first emulsified asphalt such that the first material includes a softening point of at least 80 F. In another embodiment, mixing the first emulsified asphalt with the additive increases the softening point of the first emulsified asphalt such that the first material includes a softening point of at least 100 F. In yet another embodiment, mixing the first emulsified asphalt with the additive increases the softening point of the first emulsified asphalt such that the first material includes a softening point of at least 120 F. In yet another embodiment, mixing the first emulsified asphalt with the additive increases the softening point of the first emulsified asphalt such that the first material includes a softening point of at least 150 F.

Similarly, the first material is formed 302 from the first emulsified asphalt having a penetration level of at least 500. Additionally, forming 302 the first material includes mixing the first emulsified asphalt with an additive to reduce the penetration level of the first material. More specifically, mixing the first emulsified asphalt with an additive includes mixing the first emulsified asphalt with at least one of aggregate, rubber, fibers, sand, and polymer. Furthermore, in one embodiment, mixing the first emulsified asphalt with the additive reduces the penetration level of the first emulsified asphalt such that the first material includes a penetration level of at most 300. In another embodiment, mixing the first emulsified asphalt with the additive reduces the penetration level of the first emulsified asphalt such that the first material includes a penetration level of at most 200. In yet another embodiment, mixing the first emulsified asphalt with the additive reduces the penetration level of the first emulsified asphalt such that the first material includes a penetration level of at most 120. In yet another embodiment, mixing the first emulsified asphalt with the additive reduces the penetration level of the first emulsified asphalt such that the first material includes a penetration level of at most 30.

The first material is then applied 304 to the road surface. In one embodiment, the first material is applied 304 to the road surface using the MADD 100 described above. Alternatively, the first material is applied 304 to the road surface using any means that facilitates operation as described herein. In some embodiments, applying 304 the first material on the road surface facilitates a crack filling (or crack sealing) process by urging the first material into voids, or cracks, in the pavement surface using MADD 100. In other embodiments, applying 304 facilitates uniform spreading of the first material to allow a layering effect with subsequently applied materials.

The method further includes applying 306 a second material to the first material. Specifically, the second material is applied 306 to the first material within five minutes of the first material being applied 304 to the road surface. More specifically, the second material is applied 306 to the first material within one minute of the first material being applied 304 to the road surface. Even more specifically, the second material is applied 306 to the first material within 30 seconds of the first material being applied 304 to the road surface. In one embodiment, the first and second materials are applied 304 and 306 by the same vehicle such that first and second materials are applied 304 and 306 in a single pass and the first material is not driven upon before the second material is applied 306. In another embodiment, the first and second materials are applied 304 and 306 by different vehicles in separate passes, but within seconds or minutes of each other such that no non-construction traffic drives on the first material.

The applying step 306 includes applying a second emulsified asphalt to the first material and applying a driving surface material to the second emulsified asphalt. Specifically, the second material is applied 306 to the first material such that the first material and the second material co-cure as a unified material. In one embodiment, applying 306 the second emulsified includes applying a second emulsified asphalt that is different from the first emulsified asphalt. Furthermore, applying 306 the driving surface material includes applying at least one of crushed aggregate, aggregate, lightweight aggregate, and steel slag.

In one embodiment, applying 306 the second material to the first material includes applying the driving surface material and the second emulsified asphalt simultaneously as a slurry. In another embodiment, applying 306 the second material to the first material includes applying the second emulsified asphalt to the first emulsified asphalt and subsequently applying the driving surface material to the second emulsified asphalt.

Method 200 further includes striking off excess first material from the road surface before applying the second material.

Figure 6:
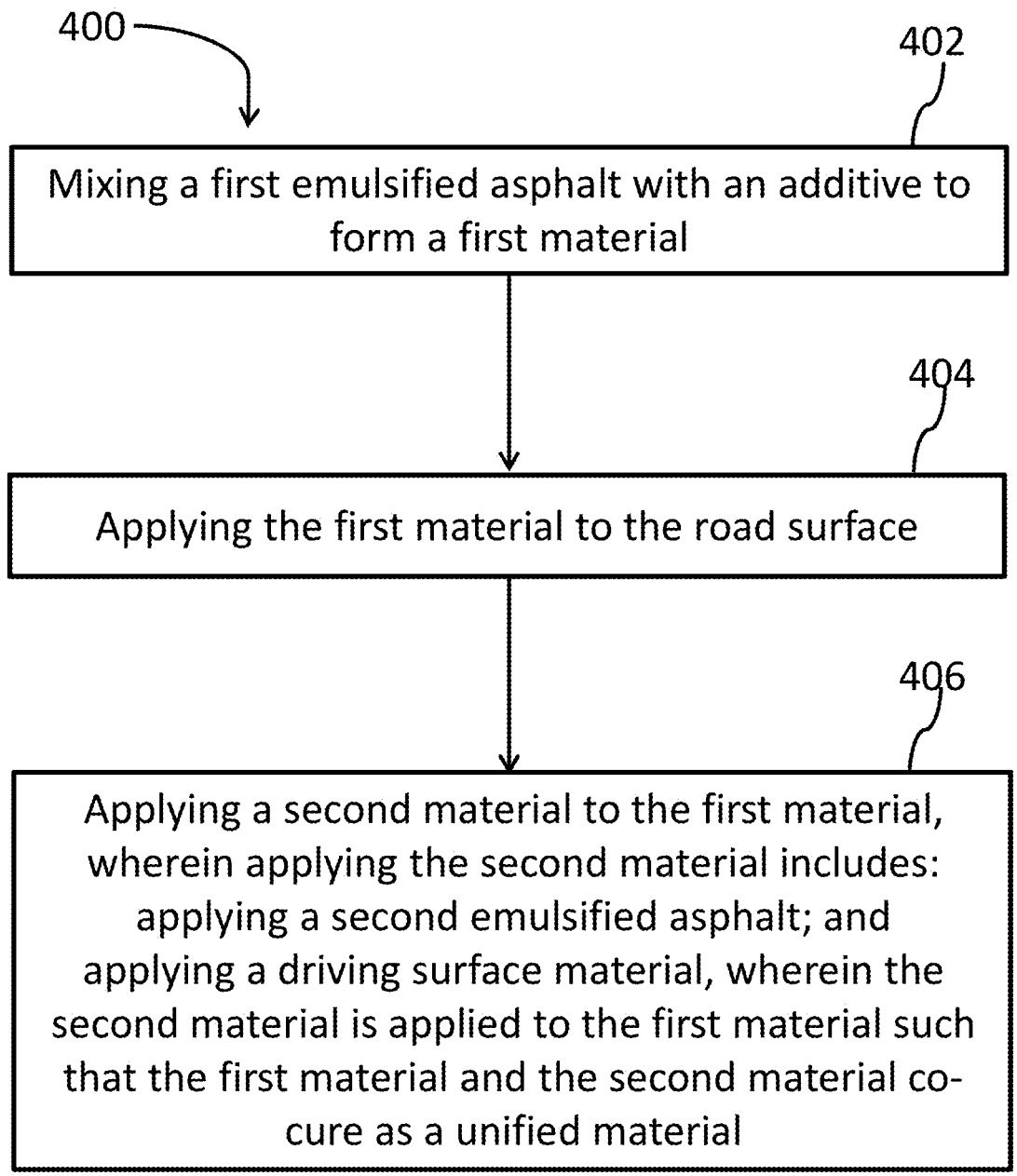
FIG. 6 is a flowchart illustrating another method for sealing and resurfacing a road surface.

FIG. 6 is a flowchart illustrating an exemplary method 400 for sealing and resurfacing a road surface. In the exemplary embodiment, method 400 is implemented by a re-surfacing system including a material dispersal device, such as system 200 shown in FIG. 2.

Method 400 includes mixing 402 a first emulsified asphalt with an additive to form a first material and then applying 404 the first material to the road surface. As described herein, the additive raises the softening point and/or decreases the penetration level of the first emulsified asphalt and may include at least one of aggregate, rubber, fibers, sand, and polymer.

In one embodiment, the first material is applied 404 to the road surface using the MADD 100 described above. Alternatively, the first material is applied 404 to the road surface using any means that facilitates operation as described herein. In some embodiments, applying 404 the first material on the road surface facilitates a crack filling (or crack sealing) process by urging the first material into voids, or cracks, in the pavement surface using MADD 100. In other embodiments, applying 404 facilitates uniform spreading of the first material to allow a layering effect with subsequently applied materials.

The method further includes applying 406 a second material to the first material. The applying step 406 includes applying a second emulsified asphalt to the first material and applying a driving surface material to the second emulsified asphalt. Specifically, the second material is applied 406 to the first material such that the first material and the second material co-cure as a unified material. In one embodiment, applying 406 the second emulsified includes applying a second emulsified asphalt that is different from the first emulsified asphalt. Furthermore, applying 406 the driving surface material includes applying at least one of crushed aggregate, aggregate, lightweight aggregate, and steel slag.

In one embodiment, applying 406 the second material to the first material includes applying the driving surface material and the second emulsified asphalt simultaneously as a slurry. In another embodiment, applying 406 the second material to the first material includes applying the second emulsified asphalt to the first emulsified asphalt and subsequently applying the driving surface material to the second emulsified asphalt.

Figure 7:
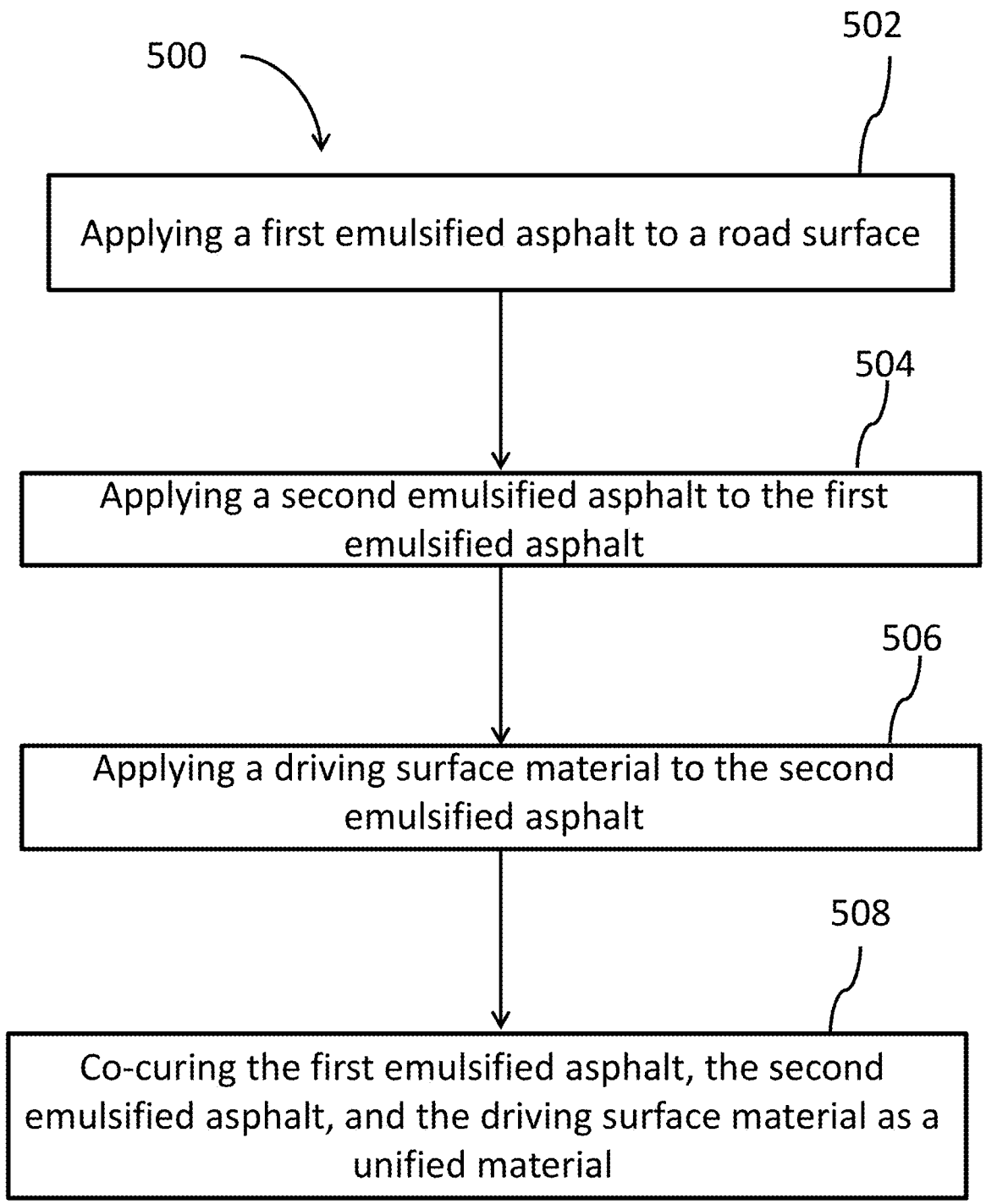
FIG. 7 is a flowchart illustrating yet another method for sealing and resurfacing a road surface.

FIG. 7 is a flowchart illustrating an exemplary method 500 for sealing and resurfacing a road surface. In the exemplary embodiment, method 500 is implemented by a re-surfacing system including a material dispersal device, such as system 200 shown in FIG. 2.

Method 500 includes applying 502 a first emulsified asphalt to a road surface and then applying 504 a second emulsified asphalt to the first emulsified asphalt. A driving surface material is then applied 506 to the second emulsified asphalt. The method 500 also includes co-curing 508 the first emulsified asphalt, the second emulsified asphalt, and the driving surface material to form a unified material.

The compositions and methods described herein facilitate re-surfacing a pavement surface. Specifically, the compositions and methods for re-surfacing describe co-curing a ductile material that is able to be facilitated into deformations in the road surface with a driving surface that is harder and stronger and able to withstand exposure to vehicle traffic. The ductile material is sufficiently tacky to adhere the driving surface thereto to form a unified material that prevents delamination of the driving surface This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A composition for sealing and resurfacing a road surface, said composition comprising:
 a first material comprising a first plurality of bitumen globules, wherein the first material is applied to the road surface as a first emulsified asphalt; and
 a second material comprising a mixture of:
  a second plurality of bitumen globules; and
  a driving surface material, wherein the second plurality of bitumen globules and the driving surface material are combined, wherein the second material is applied to the first material such that the first material and the second material interlock together as a unified material and form a gradual transition of the first material and the second material and respective properties of each.

2. The composition according to claim 1 wherein the first emulsified asphalt has a softening point of no more than 60 F.

3. The composition according to claim 2 wherein the first material comprises an additive configured to increase the softening point of the first emulsified asphalt.

4. The composition according to claim 3 wherein the additive comprises at least one of aggregate, rubber, fibers, sand, and polymer.

5. The composition according to claim 3 wherein the additive increases the softening point of the first emulsified asphalt such that the first material includes a softening point of at least 80 F.

6. The composition according to claim 3 wherein the additive increases the softening point of the first emulsified asphalt such that the first material includes a softening point of at least 100 F.

7. The composition according to claim 3 wherein the additive increases the softening point of the first emulsified asphalt such that the first material includes a softening point of at least 125 F.

8. The composition according to claim 3 wherein the additive increases the softening point of the first emulsified asphalt such that the first material includes a softening point of at least 150 F.

9. The composition according to claim 3 wherein the additive increases the softening point of the first emulsified asphalt such that the first material includes a softening point of at least 175 F.

10. The composition according to claim 1 wherein the first emulsified asphalt has a softening point of no more than 80 F.

11. The composition according to claim 10 wherein the first material comprises an additive configured to increase the softening point of the first emulsified asphalt.

12. The composition according to claim 11 wherein the additive comprises at least one of aggregate, rubber, fibers, sand, and polymer.

13. The composition according to claim 11 wherein the additive increases the softening point of the first emulsified asphalt such that the first material includes a softening point of at least 100 F.

14. The composition according to claim 11 wherein the additive increases the softening point of the first emulsified asphalt such that the first material includes a softening point of at least 125 F.

15. The composition according to claim 11 wherein the additive increases the softening point of the first emulsified asphalt such that the first material includes a softening point of at least 150 F.

16. The composition according to claim 11 wherein the additive increases the softening point of the first emulsified asphalt such that the first material includes a softening point of at least 175 F.

17. The composition according to claim 11 wherein the additive increases the softening point of the first emulsified asphalt such that the first material includes a softening point of at least 200 F.

18. The composition according to claim 1 wherein the first emulsified asphalt has a softening point of no more than 100 F.

19. The composition according to claim 18 wherein the first material comprises an additive configured to increase the softening point of the first emulsified asphalt.

20. The composition according to claim 19 wherein the additive comprises at least one of aggregate, rubber, fibers, sand, and polymer.

21. The composition according to claim 19 wherein the additive increases the softening point of the first emulsified asphalt such that the first material includes a softening point of at least 125 F.

22. The composition according to claim 19 wherein the additive increases the softening point of the first emulsified asphalt such that the first material includes a softening point of at least 150 F.

23. The composition according to claim 19 wherein the additive increases the softening point of the first emulsified asphalt such that the first material includes a softening point of at least 175 F.

24. The composition according to claim 19 wherein the additive increases the softening point of the first emulsified asphalt such that the first material includes a softening point of at least 200 F.

25. The composition according to claim 19 wherein the additive increases the softening point of the first emulsified asphalt such that the first material includes a softening point of at least 225 F.

26. The composition according to claim 1 wherein the first emulsified asphalt has a softening point of no more than 125 F.

27. The composition according to claim 26 wherein the first material comprises an additive configured to increase the softening point of the first emulsified asphalt.

28. The composition according to claim 27 wherein the additive comprises at least one of aggregate, rubber, fibers, sand, and polymer.

29. The composition according to claim 27 wherein the additive increases the softening point of the first emulsified asphalt such that the first material includes a softening point of at least 150 F.

30. The composition according to claim 27 wherein the additive increases the softening point of the first emulsified asphalt such that the first material includes a softening point of at least 175 F.

31. The composition according to claim 27 wherein the additive increases the softening point of the first emulsified asphalt such that the first material includes a softening point of at least 200 F.

32. The composition according to claim 27 wherein the additive increases the softening point of the first emulsified asphalt such that the first material includes a softening point of at least 225 F.

33. The composition according to claim 27 wherein the additive increases the softening point of the first emulsified asphalt such that the first material includes a softening point of at least 250 F.

34. The composition according to claim 1 wherein the first emulsified asphalt has a softening point of no more than 150 F.

35. The composition according to claim 34 wherein the first material comprises an additive configured to increase the softening point of the first emulsified asphalt.

36. The composition according to claim 35 wherein the additive comprises at least one of aggregate, rubber, fibers, sand, and polymer.

37. The composition according to claim 35 wherein the additive increases the softening point of the first emulsified asphalt such that the first material includes a softening point of at least 175 F.

38. The composition according to claim 35 wherein the additive increases the softening point of the first emulsified asphalt such that the first material includes a softening point of at least 200 F.

39. The composition according to claim 35 wherein the additive increases the softening point of the first emulsified asphalt such that the first material includes a softening point of at least 225 F.

40. The composition according to claim 35 wherein the additive increases the softening point of the first emulsified asphalt such that the first material includes a softening point of at least 250 F.

41. The composition according to claim 35 wherein the additive increases the softening point of the first emulsified asphalt such that the first material includes a softening point of at least 275 F.

42. The composition according to claim 1 wherein the first emulsified asphalt includes a penetration level of at least 500.

43. The composition according to claim 42 wherein the first material comprises an additive configured to reduce the penetration level of the first emulsified asphalt.

44. The composition according to claim 43 wherein the additive comprises at least one of aggregate, rubber, fibers, sand, and polymer.

45. The composition according to claim 43 wherein the additive reduces the penetration level of the first emulsified asphalt such that the first material includes a penetration level of at most 400.

46. The composition according to claim 43 wherein the additive reduces the penetration level of the first emulsified asphalt such that the first material includes a penetration level of at most 300.

47. The composition according to claim 43 wherein the additive reduces the penetration level of the first emulsified asphalt such that the first material includes a penetration level of at most 200.

48. The composition according to claim 43 wherein the additive reduces the penetration level of the first emulsified asphalt such that the first material includes a penetration level of at most 100.

49. The composition according to claim 43 wherein the additive reduces the penetration level of the first emulsified asphalt such that the first material includes a penetration level of at most 50.

50. The composition according to claim 1 wherein the first emulsified asphalt includes a penetration level of at least 400.

51. The composition according to claim 50 wherein the first material comprises an additive configured to reduce the penetration level of the first emulsified asphalt.

52. The composition according to claim 51 wherein the additive comprises at least one of aggregate, rubber, fibers, sand, and polymer.

53. The composition according to claim 51 wherein the additive reduces the penetration level of the first emulsified asphalt such that the first material includes a penetration level of at most 300.

54. The composition according to claim 51 wherein the additive reduces the penetration level of the first emulsified asphalt such that the first material includes a penetration level of at most 200.

55. The composition according to claim 51 wherein the additive reduces the penetration level of the first emulsified asphalt such that the first material includes a penetration level of at most 100.

56. The composition according to claim 51 wherein the additive reduces the penetration level of the first emulsified asphalt such that the first material includes a penetration level of at most 50.

57. The composition according to claim 1 wherein the first emulsified asphalt includes a penetration level of at least 300.

58. The composition according to claim 57 wherein the first material comprises an additive configured to reduce the penetration level of the first emulsified asphalt.

59. The composition according to claim 58 wherein the additive comprises at least one of aggregate, rubber, fibers, sand, and polymer.

60. The composition according to claim 58 wherein the additive reduces the penetration level of the first emulsified asphalt such that the first material includes a penetration level of at most 200.

61. The composition according to claim 58 wherein the additive reduces the penetration level of the first emulsified asphalt such that the first material includes a penetration level of at most 100.

62. The composition according to claim 58 wherein the additive reduces the penetration level of the first emulsified asphalt such that the first material includes a penetration level of at most 50.

63. The composition according to claim 1 wherein the first emulsified asphalt includes a penetration level of at least 200.

64. The composition according to claim 63 wherein the first material comprises an additive configured to reduce the penetration level of the first emulsified asphalt.

65. The composition according to claim 64 wherein the additive comprises at least one of aggregate, rubber, fibers, sand, and polymer.

66. The composition according to claim 64 wherein the additive reduces the penetration level of the first emulsified asphalt such that the first material includes a penetration level of at most 100.

67. The composition according to claim 64 wherein the additive reduces the penetration level of the first emulsified asphalt such that the first material includes a penetration level of at most 50.

68. The composition according to claim 1 wherein the first emulsified asphalt includes a penetration level of at least 100.

69. The composition according to claim 68 wherein the first material comprises an additive configured to reduce the penetration level of the first emulsified asphalt.

70. The composition according to claim 69 wherein the additive comprises at least one of aggregate, rubber, fibers, sand, and polymer.

71. The composition according to claim 69 wherein the additive reduces the penetration level of the first emulsified asphalt such that the first material includes a penetration level of at most 50 F.

72. The composition of claim 1, wherein the driving surface material is at least one of crushed aggregate, aggregate, lightweight aggregate, and steel slag.

73. The composition of claim 1, wherein the first material further comprises at least one filler material.

74. The composition of claim 73, wherein the filler material comprises at least one of aggregate, ground rubber, polyester fibers, and sand.

75. The composition of claim 74, wherein the filler material includes particles having a size within a range of between approximately 0.02 inches and approximately 0.125 inches.

76. The composition of claim 73, wherein the filler material comprises a first aggregate having a first size and the driving surface comprises a second aggregate having a second size different from the first size.

77. The composition of claim 1, wherein the driving surface material comprises an aggregate having a size within a range of between approximately 0.125 inches and approximately 0.375 inches.

78. The composition of claim 1, wherein the driving surface material comprises an aggregate having a size within a range of between approximately 0.5 inches and approximately 1.0 inch.

79. The composition according to claim 1, wherein the first material comprises an additive configured to increase the softening point of the first emulsified asphalt.

80. The composition according to claim 1, wherein the first material comprises a polymer.

81. The composition according to claim 80, wherein the polymer increases the softening point of the first material.

82. The composition according to claim 1, wherein the first material comprises at least one of an aggregate and a polymer.

83. The composition according to claim 82, wherein the first material comprises both an aggregate and a polymer.

84. The composition of claim 1, wherein the driving surface material and the second plurality of bitumen globules are applied simultaneously as a slurry.

85. The composition of claim 1, wherein the driving surface material is at least one of crushed aggregate, aggregate, lightweight aggregate, and steel slag.

86. The composition of claim 1, wherein the first material further comprises at least one filler material.

87. The composition of claim 86, wherein the at least one filler material comprises at least one of aggregate, ground rubber, polyester fibers, and sand.

88. The composition of claim 1, wherein the first material further comprises at least one filler material, wherein the filler material comprises a first aggregate having a first size and the driving surface comprises a second aggregate having a second size larger than the first size.

89. The composition of claim 88, wherein the second aggregate is within a range of between approximately 0.125 inches and approximately 0.325 inches.

90. The composition of claim 88, wherein the second aggregate is within a range of between approximately 0.5 inches and approximately 1.0 inch.

91. The composition of claim 87, wherein the first aggregate is within a range of between approximately 0.02 inches and approximately 0.125 inches.

92. The composition of claim 1, wherein the first emulsified asphalt is configured to fill and seal a crack on the road surface, and wherein the second material is configured to retain the driving surface material.

93. The composition according to claim 1 wherein the first material comprises an additive configured to increase the softening point of the first emulsified asphalt.

94. The composition according to claim 93 wherein the additive comprises at least one of aggregate, rubber, fibers, sand, and polymer.

95. The composition according to claim 93 wherein the additive increases the softening point of the first emulsified asphalt such that the first material includes a softening point of at least 80 F.

96. The composition according to claim 93 wherein the additive increases the softening point of the first emulsified asphalt such that the first material includes a softening point of at least 100 F.

97. The composition according to claim 93 wherein the additive increases the softening point of the first emulsified asphalt such that the first material includes a softening point of at least 125 F.

98. The composition according to claim 93 wherein the additive increases the softening point of the first emulsified asphalt such that the first material includes a softening point of at least 150 F.

99. The composition according to claim 93 wherein the additive increases the softening point of the first emulsified asphalt such that the first material includes a softening point of at least 175 F.

100. The composition according to claim 93 wherein the additive increases the softening point of the first emulsified asphalt such that the first material includes a softening point of at least 200 F.

101. The composition according to claim 93 wherein the additive increases the softening point of the first emulsified asphalt such that the first material includes a softening point of at least 225 F.

102. The composition according to claim 1 wherein the first material comprises an additive configured to reduce the penetration level of the first emulsified asphalt.

103. The composition according to claim 102 wherein the additive comprises at least one of aggregate, rubber, fibers, sand, and polymer.

104. The composition according to claim 102 wherein the additive reduces the penetration level of the first emulsified asphalt such that the first material includes a penetration level of at most 400.

105. The composition according to claim 102 wherein the additive reduces the penetration level of the first emulsified asphalt such that the first material includes a penetration level of at most 300.

106. The composition according to claim 102 wherein the additive reduces the penetration level of the first emulsified asphalt such that the first material includes a penetration level of at most 200.

107. The composition according to claim 102 wherein the additive reduces the penetration level of the first emulsified asphalt such that the first material includes a penetration level of at most 100.

108. The composition according to claim 102 wherein the additive reduces the penetration level of the first emulsified asphalt such that the first material includes a penetration level of at most 50.

109. An intermediate composition for sealing and resurfacing a road surface, said composition comprising:
a first material comprising a first plurality of bitumen globules, wherein the first material is applied to the road surface as a first emulsified asphalt; and
a second material comprising a mixture of:
a second plurality of bitumen globules; and
a driving surface material, wherein the second plurality of bitumen globules and the driving surface material are combined, wherein the second material is applied to the first material simultaneously such that the first material and the second material interlock together as a unified material and form a gradual transition of the first material and the second material and respective properties of each.

110. The composition of claim 109, wherein the first emulsified asphalt is different from the second emulsified asphalt.

111. The composition of claim 110, wherein the first emulsified asphalt is configured to fill and seal a crack on the road surface and wherein the second emulsified asphalt is configured to retain the driving surface material.

112. The composition of claim 110, wherein the driving surface material and the second emulsified asphalt are applied simultaneously as a slurry.

113. The composition of claim 110, wherein the second emulsified asphalt is applied to the first material and the driving surface material is applied separately to the second emulsified asphalt.

114. The composition according to claim 110, wherein the first emulsified asphalt has a first softening point and the second emulsified asphalt has a second softening point higher than the first emulsified asphalt.

115. The composition according to claim 110, wherein the first emulsified asphalt has a first penetration level and the second emulsified asphalt has a second penetration level lower than the first penetration level.

116. The composition of claim 109, wherein the first material further comprises at least one filler material, wherein the filler material comprises a first aggregate having a first size and the driving surface comprises a second aggregate having a second size larger than the first size.

117. The composition according to claim 109, wherein the first emulsified asphalt has a softening point of no more than 60 F.

118. The composition according to claim 109, wherein the first emulsified asphalt includes a penetration level of at least 500.

119. The composition of claim 109, wherein the driving surface material is at least one of crushed aggregate, aggregate, lightweight aggregate, and steel slag.

120. The composition of claim 109, wherein the first material further comprises at least one filler material.

121. The composition according to claim 109, wherein the first material comprises an additive configured to increase the softening point of the first emulsified asphalt.

122. The composition according to claim 109, wherein the first material comprises a polymer.

123. The composition according to claim 109, wherein the first material comprises at least one of an aggregate and a polymer.

124. The composition of claim 109, wherein the driving surface material and the second plurality of bitumen globules are applied simultaneously as a slurry.

125. The composition of claim 109, wherein the first material further comprises at least one filler material, wherein the filler material comprises a first aggregate having a first size and the driving surface comprises a second aggregate having a second size larger than the first size.

126. The composition of claim 125, wherein the second aggregate is within a range of between approximately 0.125 inches and approximately 0.325 inches.

127. The composition of claim 125, wherein the second aggregate is within a range of between approximately 0.5 inches and approximately 1.0 inch.

128. The composition of claim 125, wherein the at least one filler material comprises at least one of aggregate, ground rubber, polyester fibers, and sand, wherein the first aggregate is within a range of between approximately 0.02 inches and approximately 0.125 inches.

* * * * *